US005512984A

United States Patent [19]

Kimura et al.

[11] Patent Number: 5,512,984

[45] Date of Patent: Apr. 30, 1996

[54] REVOLVER TYPE DEVELOPING DEVICE FOR AN IMAGE FORMING APPARATUS

[75] Inventors: Noriyuki Kimura, Kawasaki; Minoru Suzuki, Yokohama; Takatsugu Fujishiro, Tokyo, all of Japan

[73] Assignee: Ricoh Company, Ltd., Tokyo, Japan

[21] Appl. No.: 287,418

[22] Filed: Aug. 9, 1994

[30] Foreign Application Priority Data

Aug. 9, 1993 [JP] Japan .................................... 5-217000
Aug. 9, 1993 [JP] Japan .................................... 5-217001

[51] Int. Cl.[6] .............................. G03B 15/01; G03B 15/88

[52] U.S. Cl. .............................................. 355/245; 118/645

[58] Field of Search ................................ 355/245, 326 R, 355/327; 118/645

[56] References Cited

U.S. PATENT DOCUMENTS 4,615,612 10/1986 Ohno et al. ............................. 355/245
4,792,825 12/1988 Saito et al. .............................. 355/245
4,922,301 5/1990 Katoh et al. .
5,115,275 5/1992 Suzuki .
5,168,319 12/1992 Kimura et al. .
5,198,866 3/1993 Kimura et al. .
5,258,819 11/1993 Kimura et al. .
5,325,151 6/1994 Kimura et al. .
5,331,390 7/1994 Kimura et al. .
5,339,141 8/1994 Suzuki et al. .

*Primary Examiner*—Joan H. Pendegrass
*Attorney, Agent, or Firm*—Oblon, Spivak, McClelland, Maier & Neustadt

[57] ABSTRACT

In an image forming apparatus, a revolver type developing device has a plurality of developing units and revolves to sequentially bring them to a developing position facing an image carrier on which a latent image is electrostatically formed. The revolver promotes easy replacement and safe handling of the developing units and can be accurately positioned relative to the body of the image forming apparatus. Despite that the revolver is miniature, it prevents developers from leaking or flying off from the developing units and contaminating the inside of the apparatus or being mixed with each other.

25 Claims, 13 Drawing Sheets

REVOLVER TYPE DEVELOPING DEVICE FOR AN IMAGE FORMING APPARATUS

BACKGROUND OF THE INVENTION

The present invention relates to a revolver type developing device for a copier, facsimile apparatus, printer or similar image forming apparatus. More particularly, the present invention is concerned with a revolver type developing device having a plurality of developing units arranged around a rotary shaft and each storing a powdery developer of particular color. In this type of developing device, one of the developing units is brought to a developing device at a time so as to image develop a latent image electrostatically formed on an image carrier.

A full-color image forming apparatus, e.g., copier is conventional which scans an image carrier with a color-separated optical image to form a latent image, develops the latent image with a toner complementary in color to the optical image, and repeats such a procedure while transferring the resulting toner images from the image carrier to a single paper or similar recording medium one above the other. Also known in the art is a multicolor image forming apparatus which exposes an image carrier to optical images expected to be reproduced in different colors independently of each other, develops each of the resulting latent images in a particular color to form a corresponding toner image, and transfers such toner images to a single paper one above the other. In any case, this kind of image forming apparatus needs a plurality of developing units for effecting development in a plurality of colors. The problem with such an apparatus is that arranging the developing units side by side in the vicinity of the image carrier makes the developing device and, therefore, the entire image forming apparatus bulky.

In light of the above, there has been proposed a revolver type developing device having a rotatable body adjoining an image carrier. The rotatable body accommodates a plurality of developing units therein which are each located at a particular position. The rotatable body is rotated to sequentially bring the developing units to a developing position facing the image carrier, so that each developing unit develops a respective latent image with a toner of particular color. This type of developing device is taught in, for example, Japanese Utility Model Laid-Open Publication Nos. 51-108639 and 52-110442. Such a device, however, brings about another problem that toners are apt to leak or fly about off from the developing units located at positions other than the developing position, since each developing unit has an opening which will face the image carrier when moved to the developing position. The toners leaked or scattered around contaminate optics, among others, and enter the other developing units to cause color mixture to occur.

To eliminate the problem stated above, the revolver type developing device may be enclosed by a casing or similar screening member having an opening, as disclosed in, for example, Japanese Patent Laid-Open Publication Nos. 58-172660, 60-162271 and 60-238872. The screening member successfully prevents the toners from leaking or flying about out of the developing units.

However, the casing scheme taught in, for example, the above-mentioned Laid-Open Publication No. 58-172660 has many issues yet to be solved, as follows.

(1) The casing surrounds the entire revolver and is supported around a shaft which defines the axis of rotation of the revolver. Hence, the casing cannot be reduced in size beyond a certain limit and is complicated and expensive in configuration.

(2) Since the entire revolver is covered with the casing, it is difficult to position the revolver accurately relative to the apparatus body. In addition, the construction of a drive transmission mechanism from the apparatus body to the revolver is limited.

(3) The casing enclosing the entire revolver makes it difficult to build the revolver in the casing.

(4) A current trend in the imaging art is toward a facsimile, printer or similar image forming apparatus having an implementation for user-oriented replacement. In this respect, the revolver with the casing obstructs the replacement of the developing units by the user, safety handing of the developing units, and easy handling of fresh developing units. Particularly, since gears and other drive members built in the revolver are at least partly positioned outside of the casing, they are apt to hurt the operator in the event of, for example, replacement of the developing units.

(5) The revolver is free to rotate relative to the casing. Assume that the revolver is dismounted from the apparatus body, and the positioning of the revolver relative to the casing and the support for the revolver are cancelled. Then, the revolver rotates relative to the casing such that the center of gravity thereof is brought to the lowest position. Specifically, the revolver swings like a pendulum and then stops moving. This kind of behavior is conspicuous with a revolver in use or used since the amount of remaining toner depends on the developing unit. Assume that the revolver behaves in such a manner when the user user or serviceman removes the revolver from the apparatus body from the replacement of the developing units or similar purpose. Then, the center of gravity of the entire revolver, including the casing, is displaced. As a result, the person handling the revolver is apt to lose his balance and drop the revolver or to hit it against surrounding devices or equipment. Also, it is likely that packages come down in the event of shipment from a factory. Such an occurrence is apt to damage the gears and other drive members built in the revolver. To form an image, the revolver has to be moved to and held at the developing position. Usually, the revolver is rotated to and held at a reference position or home position. However, since the revolver behaves relative to the casing when removed from the apparatus body, as stated above, the position of the revolver relative to the axis of rotation becomes arbitrary. As a result, when the revolver is mounted to the apparatus body afterwards, it cannot be rotated to the reference position without wasting time and cost. Moreover, the time and distance necessary for the revolver to return to the reference position increase, aggravating the erroneous detection of the reference position.

(6) Assume that, to apply a preselected bias voltage to each developing unit, the developer carrier of each developing unit, for example, has the shaft thereof extended to the outside of the casing and connected to an electrode. Then, the portion connecting the shaft and electrode is located outside of the casing and, therefore, apt to deform due to external forces. The deformation, as well as the deposition of impurities on such a portion, is apt to make the contact defective.

On the other hand, none of the previously mentioned Laid-Open Publication Nos. 60-162271 and 60-238872, for example, describes or even suggests a method of mounting the casing or cover to the revolver, a method of holding the casing in the apparatus body while preventing it from rotating, a method of handling the casing and revolver when the revolver is removed from the apparatus body, etc.

SUMMARY OF THE INVENTION

It is, therefore, an object of the present invention to provide a revolver type developing device for an image forming apparatus which promotes easy replacement of developing units, safety handling of the units, and easy handling of fresh developing units.

It is another object of the present invention to provide a revolver type developing device for an image forming apparatus which can be accurately positioned relative to the body of the apparatus.

It is another object of the present invention to provide a revolver type developing device for an image forming apparatus which is miniature and, in addition, prevents developers from leaking or flying off from developing units and contaminating the inside of the apparatus or being mixed with each other.

It is another object of the present invention to provide a revolver type developing device for an image forming apparatus which is easy to transport and to mount and dismount from the body of the apparatus.

It is another object of the present invention to provide a revolver type developing device for an image forming apparatus which insures contact with a preselected voltage source.

It is another object of the present invention to provide a revolver type developing device for an image forming apparatus which facilitates maintenance, disassembly, recycling, etc.

It is another object of the present invention to provide a revolver type developing device for an image forming apparatus which allows developing units and a cover member to be easily mounted to each other and enhances accurate positioning thereof.

It is another object of the present invention to provide a revolver type developing device for an image forming apparatus which maintains developing units and a cover in a preselected positional relation in the direction of rotation.

In accordance with the present invention, a revolver type developing device for developing a latent image electrostatically formed on an image carrier of an image forming apparatus by moving a plurality of developing units, one at a time, to a developing position facing image the carrier has a casing rotatable about a shaft. A plurality of developing units are accommodated in the casing and rotatable about the shaft. The developing units are selectively brought to the developing position for developing the latent image. A pair of end wall members are provided at longitudinally opposite ends of the developing units. The end walls each has a disk portion and a hollow cylindrical portion extending outward in a longitudinal direction from the edge of the disk portion. The hollow cylindrical portion is formed with an opening.

Also, in accordance with the present invention, a revolver type developing device for developing a latent image electrostatically formed on an image carrier of an image forming apparatus by moving a plurality of developing units, one at a time, to a developing position facing the image carrier has a casing rotatable about a shaft. A plurality of developing units are accommodated in the casing and rotatable about the shaft. The developing units are selectively brought to the developing position for developing the latent image and are provided with respective developer carriers. A pair of end wall members are provided at longitudinally opposite ends of the developing units, and each has at least a disk portion. A hollow cylindrical cover member extends between the end wall members and is spaced apart from the developer carriers by a predetermined gap.

Further, in accordance with the present invention, a revolver type developing device for developing a latent image electrostatically formed on an image carrier of an image forming apparatus by moving a plurality of developing units, one at a time, to a developing position facing the image carrier has a casing rotatable about a shaft. A a plurality of developing units are disposed in the casing and rotatable about the shaft. The developing units are selectively brought to the developing position for developing the latent image and have respective developer carriers. A pair of end wall members are provided at longitudinally opposite ends of the developing units, and each has a smaller diameter portion, a greater diameter portion extending outward from the smaller diameter portion in a longitudinal direction, and a disk portion located at one of the longitudinally opposite ends. A cover member extends between the end wall members and is spaced apart from the developer carriers by a predetermined gap. The cover member is formed with an opening at a position which faces the image carrier and having an inside diameter smaller than the diameter of the greater diameter portion. The end wall members hold the cover member between the greater diameter portions thereof.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
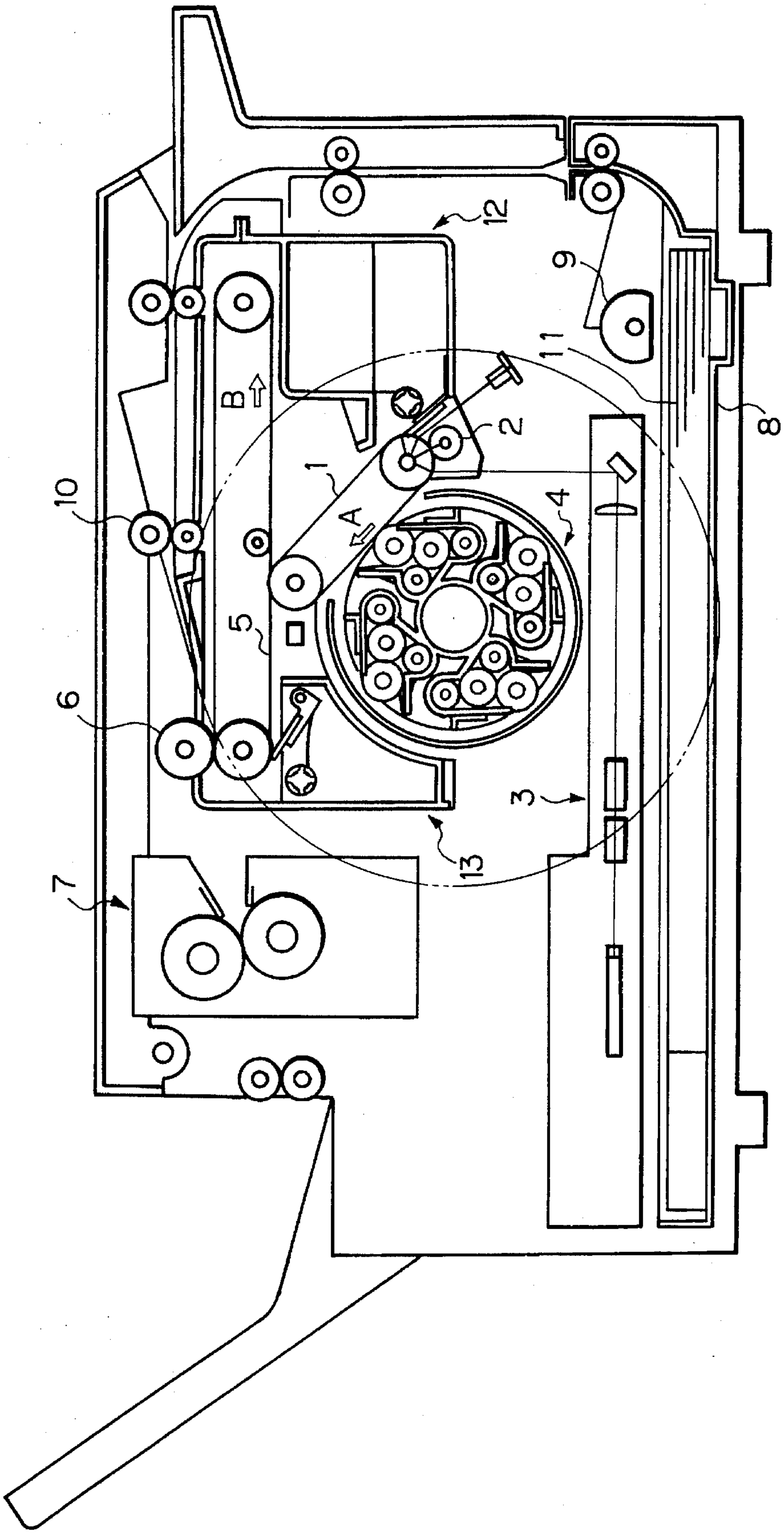
FIG. 1 is a section of a printer using a revolver type developing device embodying the present invention.

Referring to FIG. 1 of the drawings, an image forming apparatus using a revolver type developing device embodying the present invention is shown and implemented as a full-color printer by way of example. As shown, the printer has a photoconductive element, or image carrier, in the form of a belt 1. After a charge roller 2 has uniformly charged the surface of the belt 1, laser optics 3 scans the charged surface in accordance with image data to thereby form an electrostatic latent image thereon. The words "image data" refer to each of color image data produced by separating a desired full-color image into yellow, magenta, cyan and black components. A revolver type developing device, or simply revolver as referred to hereinafter, 4 sequentially develops the individual latent images with toners or developers of corresponding colors, i.e., yellow, magenta, cyan and black toners. As a result, toner images of respective colors are sequentially formed on the belt 1.

The photoconductive belt 1 is rotated in a direction indicated by an arrow A in FIG. 1. An intermediate transfer belt 5 is rotated in synchronism with the belt 1 in a direction B also shown in FIG. 1. The yellow, magenta, cyan and black toner images formed on the belt 1 by the above procedure are sequentially transferred to the intermediate transfer belt 5 in this order one above the other. A paper or similar recording medium 11 is fed from a tray 8 to an image transfer position by a pick-up roller 9 and a registration roller 10. The composite color image on the intermediate transfer belt 5 is transferred to the paper 11 at the image transfer position. A fixing unit 7 fixes the toner image on the paper 11 to complete a full-color image. After the image transfer, the toner remaining on the belt 1 is removed by a cleaner 12 assigned to the belt 1. Likewise, the toner remaining on the belt 5 is removed by an exclusive cleaner 13.

Figure 2:
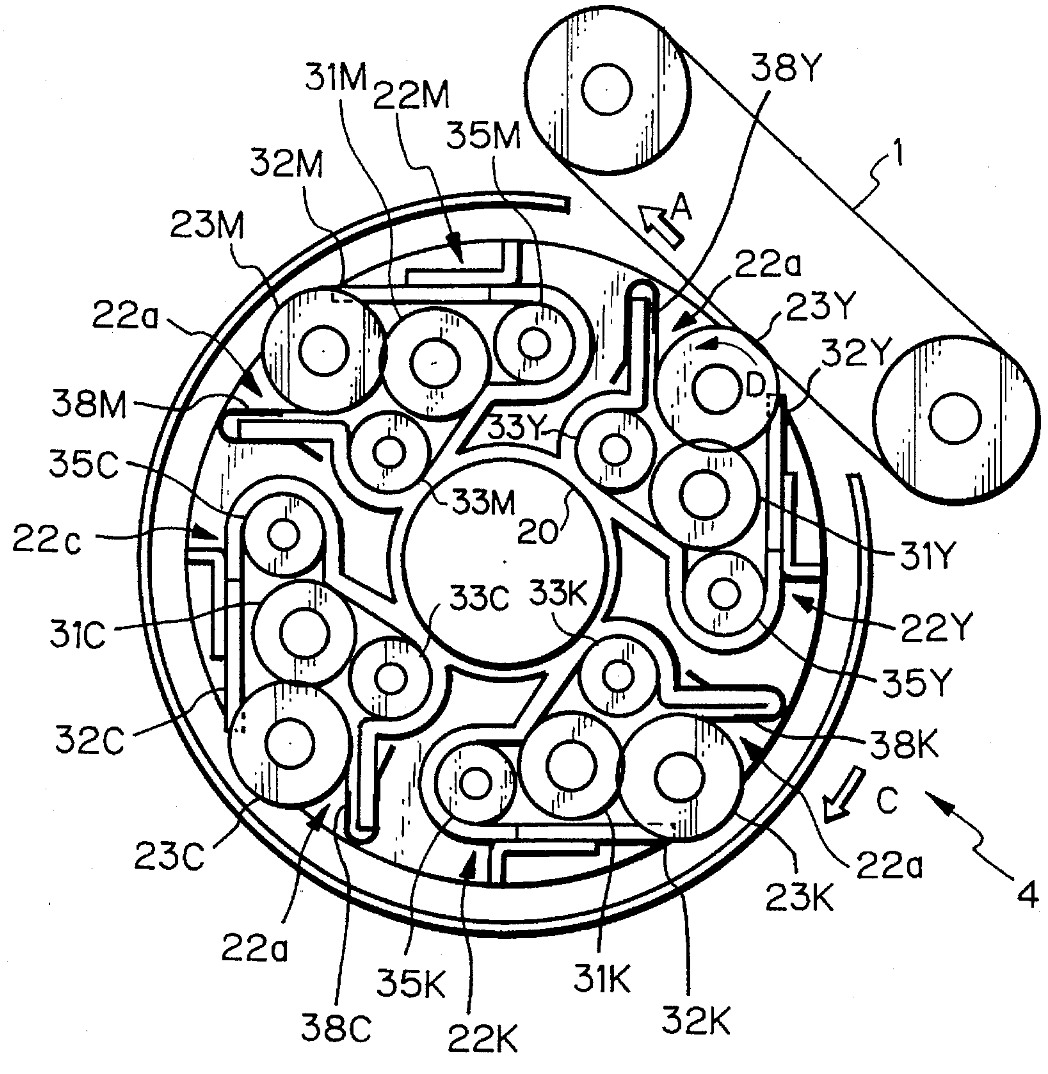
FIG. 2 is a section of the developing device shown in FIG. 1.

As shown in FIG. 2, the revolver 4 is located the in vicinity of the photoconductive belt 1 and has a yellow developing unit 22Y, a magenta developing unit 22M, a cyan developing unit 22C, and a black developing unit 22K. In the figure, the yellow developing unit 22Y is shown as being located at a developing position by way of example. A casing, or rotatable body, 20 is rotatable about a shaft O (see FIG. 9A) in a direction indicated by an arrow C. In this sense, the shaft O defines the axis of rotation of the casing 20. A drive mechanism, not shown, is drivably connected to the casing 20. The casing 20 is partitioned into four compartments which constitute the developing units 22Y, 22M, 22C and 22K, respectively.

The developing units 22Y, 22M, 22C and 22K respectively store yellow, magenta, cyan and black toners each of which is a nonmagnetic one-component type developer. Developing rollers, or developer carriers, 23Y, 23M, 23C and 23K are disposed in the developing units 22Y, 22M, 22C and 22K, respectively. The developing rollers 23Y–23K are selectively exposed to the outside via respective openings 22*a* formed through the casing 20.

In operation, the revolver 4 is rotated about the shaft O such that the developing units 22Y–22K are selectively brought to the developing position in synchronism with color dam. At the developing position, the developing units 22Y–22K cause the respective developing rollers 23Y–23K to rotate in a direction D, FIG. 2, thereby developing associated latent images sequentially formed on the belt 1. The resulting toner images are sequentially transferred to the belt 5 and then to the paper 11 one above the other to turn out a full-color image, as stated earlier.

The construction of the developing units 22Y–22K will be described in detail. Since the developing units 22Y–22K are configured and operated in exactly the same manner, let the following description concentrate on the yellow developing unit 22Y by way of example. In FIG. 2, the corresponding members of the developing units 22Y–22K are designated by the same reference numerals except for the suffix.

Figure 3A:
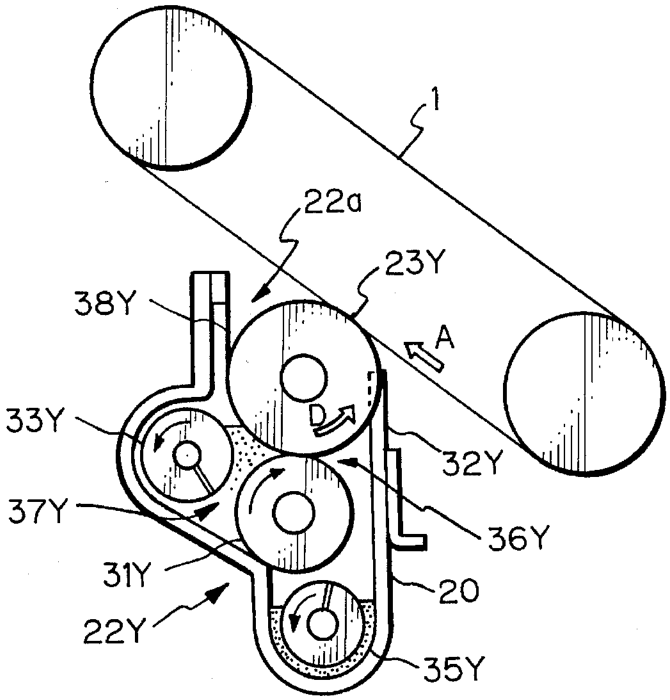
FIG. 3A is a section of of a developing unit included in the embodiment.
Figure 3B:
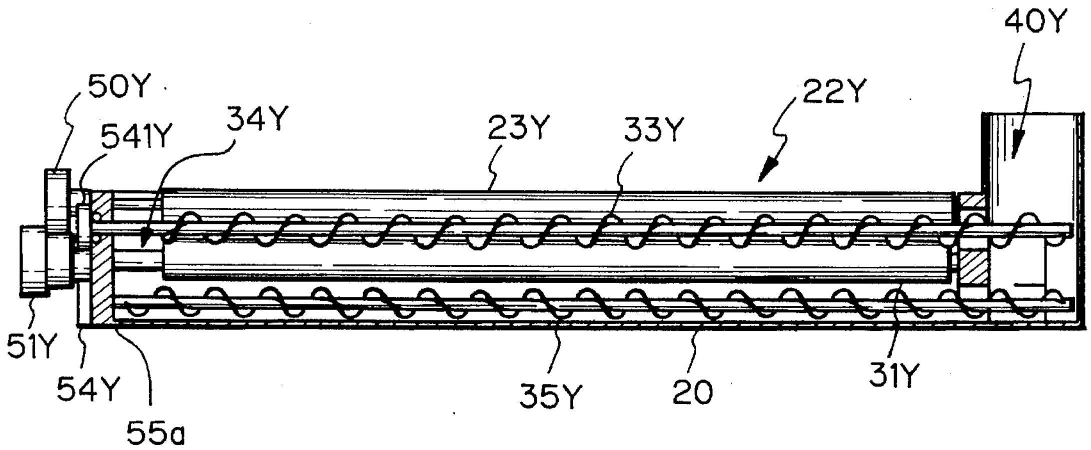
FIG. 3B shows the general construction of the developing unit.

FIGS. 3A and 3B show the yellow developing unit 22Y specifically. As shown, to develop a latent image, the developing unit 22Y is brought to a position below the photoconductive belt 1 so as to supply the yellow toner to the latent image. The opening 22*a* of the developing unit 22, which is formed through the casing 20, faces upward when the unit 22Y is brought to the developing position. The developing roller 23Y faces the belt 1 via the opening 22*a*. The roller 23Y is rotatable at a peripheral speed which is in a predetermined ratio to that of the belt 1. At the position where the roller 23Y faces the belt 1, the former moves in the same direction as the latter. A screening member 38Y contacts the surface of the roller 23Y at the free end thereof at a position downstream, with respect to the direction of rotation of the roller 23Y, of the position where the roller 23Y contacts the belt 1. The screening member 38Y prevents the toner from leaking or flying off via the opening 22*a*.

A toner supply member in the form of a roller 31Y is located below the developing roller 23Y and made of foam polyurethane or similar elastic material. Frictionally contacting the roller 23Y, the roller 31Y is rotatable at a peripheral speed which is in a predetermined ratio to that of the roller 23Y. At a position 36Y where the roller 31Y contacts the roller 23Y, the former moves in the same direction as the latter. A blade 32Y is made of urethane rubber or similar elastic material and located downstream of the roller 31Y with respect to the direction of rotation of the roller 23Y and in the vicinity of the opening 22*a*. The free end portion of the blade 32Y is held in contact with the roller 23Y. A first toner conveyor member 33Y is positioned at the left-hand side of the above-mentioned position 36Y and implemented as a screw. The first screw 33Y conveys the toner from the front to the rear in the direction perpendicular to the sheet surface of FIG. 3A. A second toner conveyor member 35Y is positioned below the roller 31Y and also implemented as a screw. The second screw 35Y conveys the toner from the rear to the front in the above-mentioned direction. The first and second screws 33Y and 35Y will be described in detail later.

Figure 4:
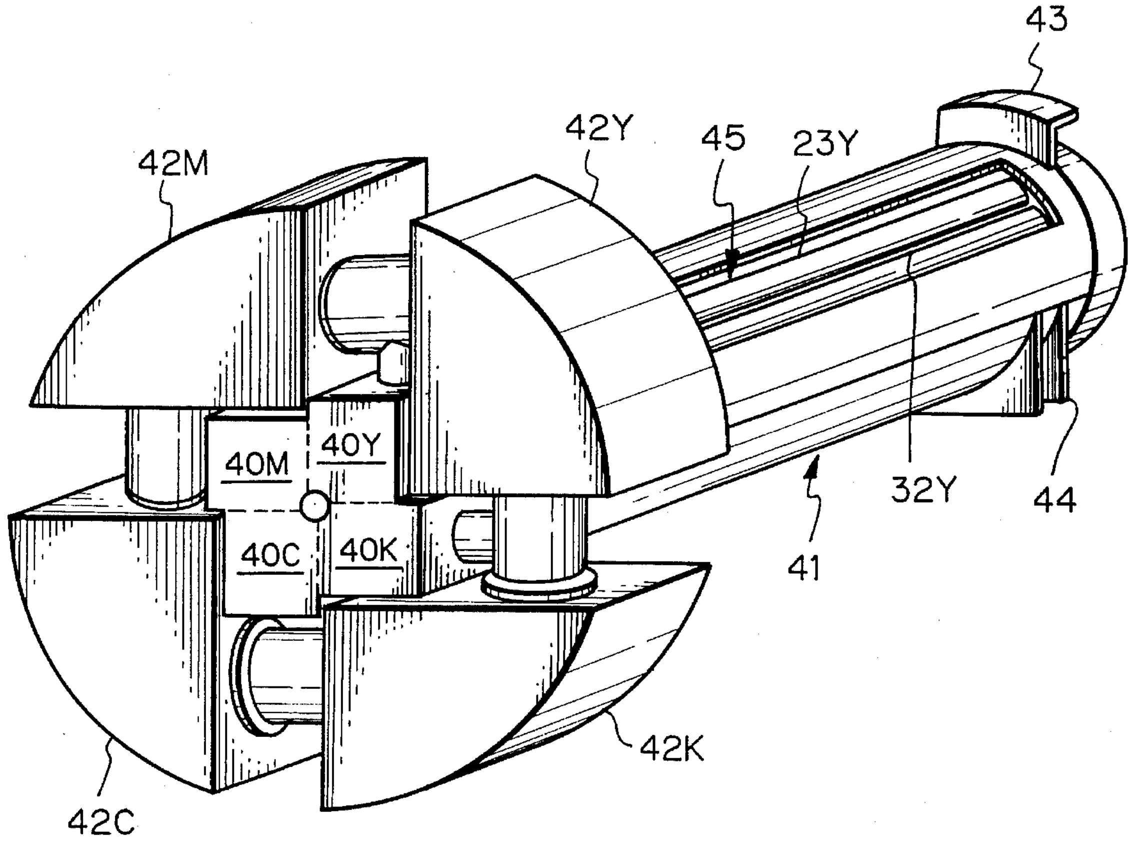
FIG. 4 is a perspective view of the embodiment.

As shown in FIGS. 3B and 4, the developing unit 22Y has a toner chamber 40Y at one of longitudinally opposite ends thereof. The first screw 33Y extends from the toner chamber 40Y to the other end of the developing unit 22Y in parallel with the developing roller 23Y and toner supply roller 31Y. To convey the toner from the toner chamber 40Y toward the other end of the developing unit 22Y, the screw 33Y is rotated in association with the rollers 23Y and 31Y and in a predetermined peripheral speed ratio to the latter. As shown in FIG. 3A, part of the casing 20 contacts the roller 31Y. In this configuration, the rollers 23Y and 31Y and casing 20 define a toner transport space 37Y surrounding the screw 33Y.

The first screw 33Y, rotating in a predetermined direction, conveys the toner from the toner chamber 40 to the toner transport space 37Y, thereby supplying it to the toner supply roller 31Y. At the position 36Y, the toner deposited on the roller 31Y is transferred to the surface of the developing roller 23Y while being frictionally charged by the rollers 31Y and 23Y. The blade 32Y regulates the toner deposited on the roller 23Y to form a thin toner layer having a predetermined thickness. The roller 23Y develops the latent image formed on the belt 1 with the toner in or out of contact with the belt 1.

Part of the toner not used during development is conveyed by the first screw 33Y to the end of the developing unit 22Y remote from the toner chamber 40Y. As shown in FIG. 3B, the end of the unit 22Y remote from the toner chamber 40Y is configured as a recirculating section 34Y. The recirculating section 34Y is positioned outboard of the effective diameter portions of the rollers 23Y and 31Y in the axial direction. The toner brought to the recirculating section 34Y by the first screw 33Y falls toward the bottom of the developing unit 22Y due to gravity. The second screw 35Y, parallel to the rollers 23Y and 31Y and first screw 33Y, receives the toner fallen from the screw 33Y and returns it to the toner chamber 40Y.

By selecting the amounts of conveyance by the screws 33Y and 35Y adequately, it is possible to supply the toner to the toner supply roller 31Y without sensing the amount of toner in the developing unit 22Y or executing complicated supply control. Furthermore, the revolver 4 with such developing units 22Y–22K can be freely laid out and needs a minimum of sectional area relative to a photoconductive element.

In FIG. 4, labeled 42Y, 42M, 42C and 42K are toner cartridges respectively removably mounted to the toner chambers 40Y, 40M, 40C and 40K of the developing units 22Y, 22M, 22C and 22K. When the revolver 4 is newly mounted to the printer or when the cartridges 42Y–42K run out of toner, the cartridges 42Y–42K are mounted or replaced. Hence, a necessary amount of toner is stored in each of the toner chambers 40Y–40K at all times.

A drive mechanism associated with the developing units will be described hereinafter, again taking the yellow developing unit 22Y as an example.

Figure 5A:
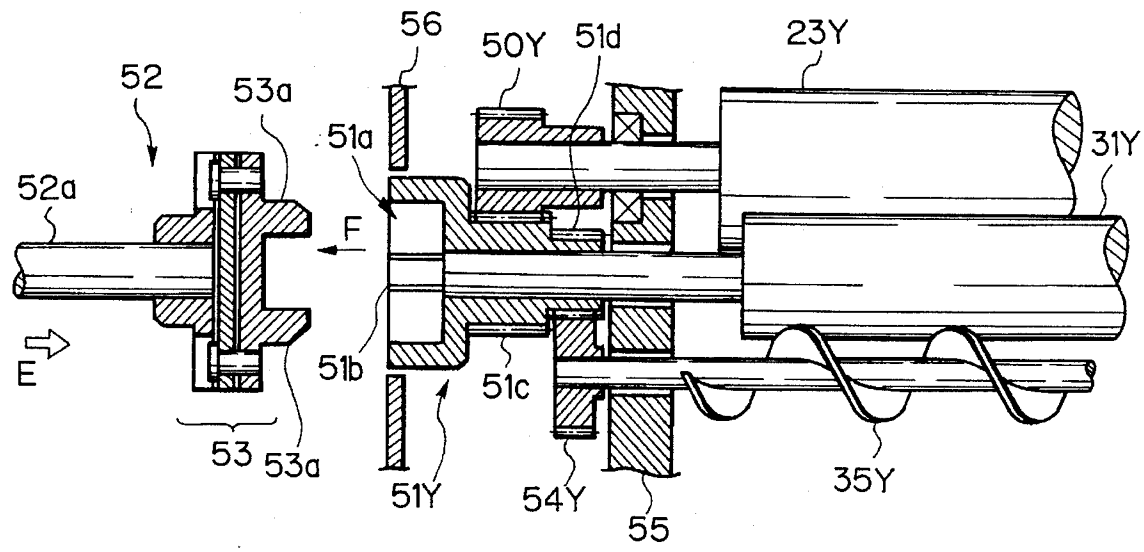
FIGS. 5A and 5B are sections showing a joint and a drive section included in the embodiment in an uncoupled condition and a coupled condition, respectively.
Figure 5B:
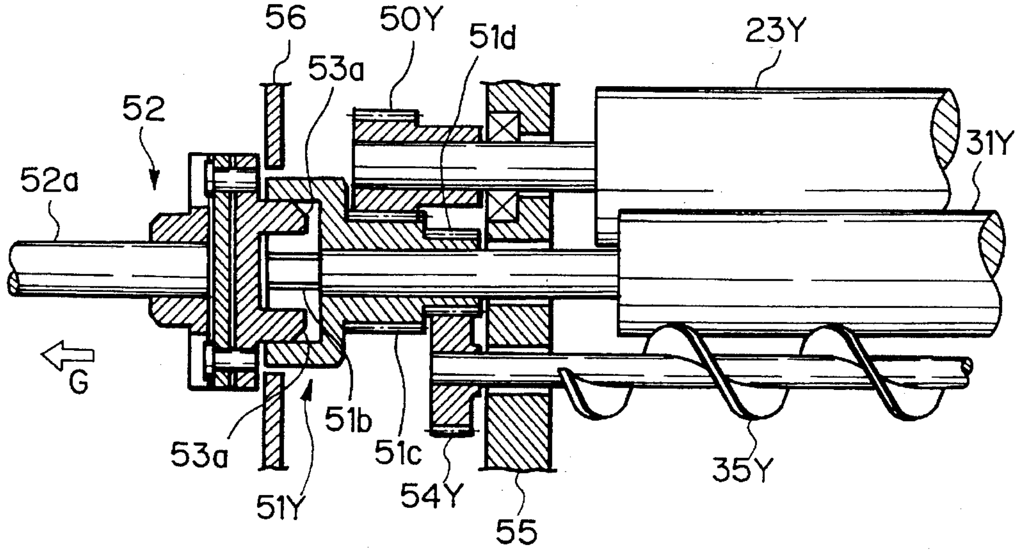
Figure 6A:
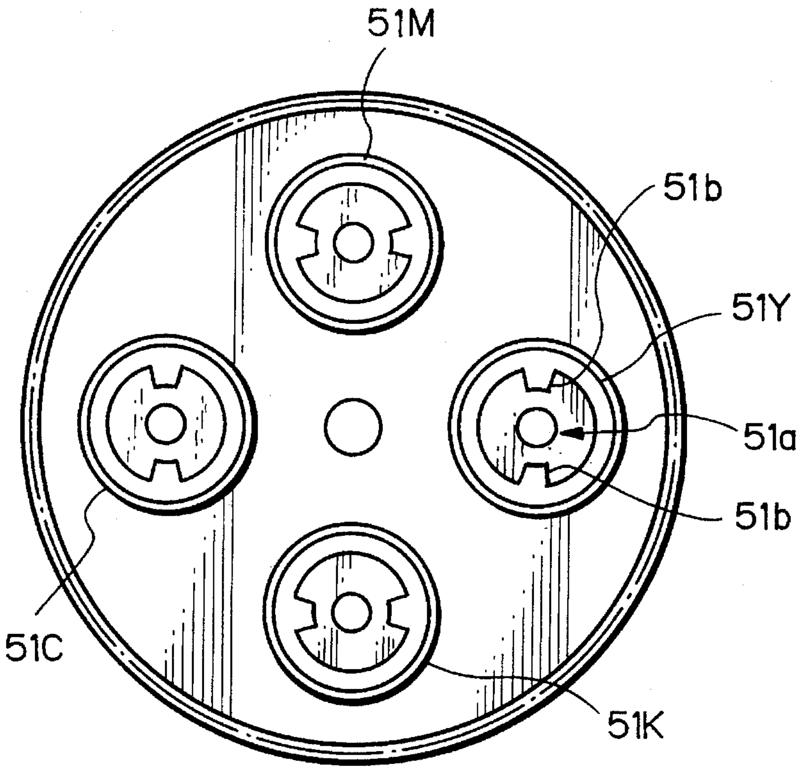
FIG. 6A shows the configuration of the concavities of coupling gears shown in FIGS. 5A and 5B.
Figure 6B:
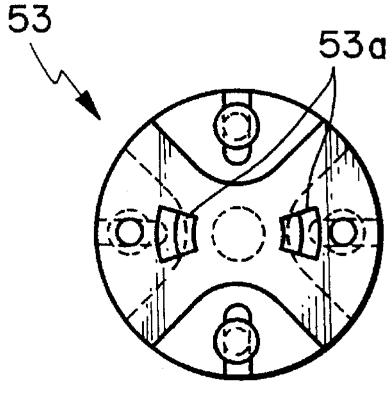
FIG. 6B is a section as seen in a direction F of FIG. 5A.

Referring to FIGS. 5A and 5B, a concave coupling gear 51Y is mounted on the end of the shaft of the toner supply roller 31Y which adjoins the recirculating section 34Y. The coupling gear 51Y is rotatable integrally with the roller 31Y. As shown in FIG. 6A, a pair of pawls 51*b* are provided in the concavity 51*a* of the coupling gear 51Y. A joint 52 is mounted on the body of the printer substantially coaxially with the roller 31Y and coupling gear 51Y. The joint 52 is rotatable and is slidable in the axial direction thereof. When the joint 52 is rotated in engagement with the coupling gear 51Y, a drive force is transmitted to the roller 31Y and other movable members of the developing unit 22Y. Assume that the developing unit 22Y, for example, is brought to the developing position where it faces the belt 1 in order to develop a latent image. Then, the joint 52 is slid by a solenoid or similar pressing mechanism, not shown, in a direction E while being rotated by a drive transmission mechanism, not shown. The joint 52 has at the end thereof a coupling 53, resembling an Oldham's coupling, mounted on a rotatable and slidable shaft 52*a*. The coupling 53 has a pair of lugs 53*a* at the end thereof which can mate with the pawls 51*b* of the coupling gear 51Y. FIG. 6B is a view as seen in a direction F shown in FIG. 5A. As the joint 52 is slid more than a predetermined distance, the lugs 53*a* of the coupling 53 enter the concavity 51*a* of the coupling gear 51Y, as shown in FIG. 5B. Then, the lugs 53*a* mate with the pawls 51*b* of the coupling gear 51Y due to the rotation of the joint 52. As a results the roller 31Y is rotated in a predetermined direction at a predetermined speed.

The coupling gear 51Y has a shank portion formed with gears 51*c* and 51*d*. The gears 51*c* and 51*d* are respectively held in mesh with a gear 50Y mounted on the shaft of the developing roller 23Y and a gear 54Y mounted on the shaft of the second screw 35Y. A gear 541Y, FIG. 3B, is mounted on the shaft of the first screw 33Y, although not shown in FIGS. 5A and 5B. The gear 541Y is held in mesh with a gear 51*d* formed in the coupling gear 51Y. The lugs 53*a* of the coupling 53 have their ends tapered, so that they can enter the concavity 51*a* of the coupling gear 51Y smoothly. Since the joint 52 is caused to slide while rotating, as stated earlier, the lugs 53*a* can surely mate with the pawls 51*b* of the coupling gear 51Y.

Figure 7A:
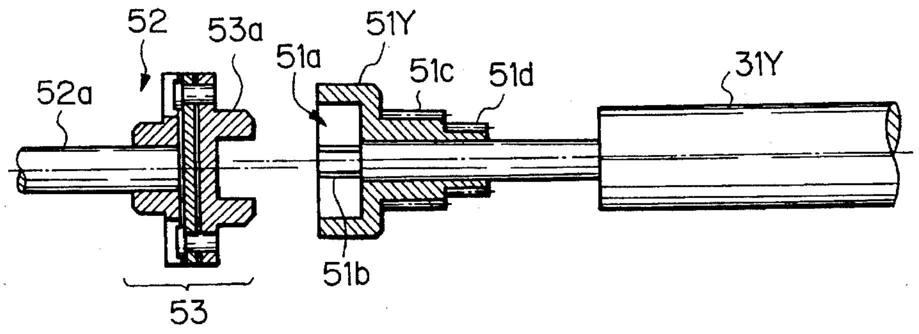
FIGS. 7A, 7B and 7C each shows a particular defective relation between a joint shaft and a toner supply roller shaft.
Figure 7B:
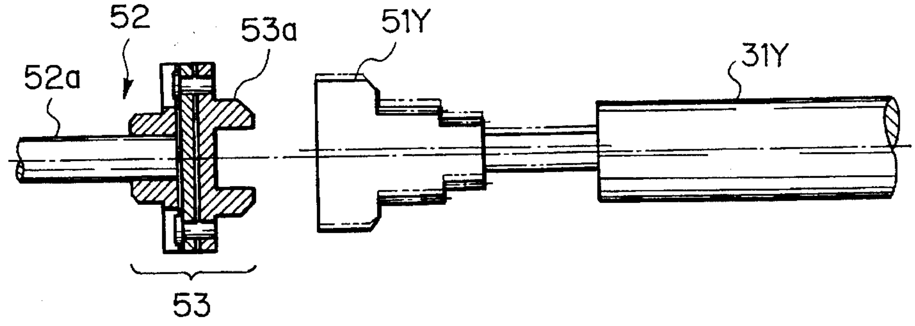
Figure 7C:
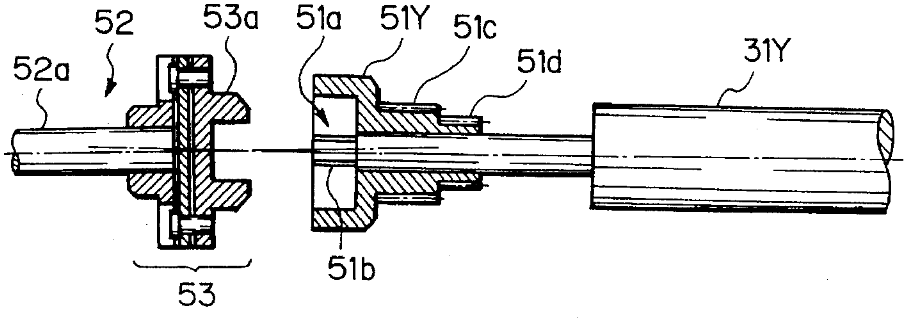

The coupling 53, resembling an Oldham's coupling, transmits a stable driving force to the developing units 22Y–22K. Specifically, the coupling 53 successfully absorbs irregular rotations attributable to the displacement of the relative position of the joint shaft 52*a* and the shaft of the roller 31Y (see FIG. 7A) and the eccentricity of the joint shaft 52*a* and roller 31Y (see FIG. 7B), vibrations acting on the revolver 4, and the deviation in shaft angle between the joint shaft 52*a* and the shaft of the roller 31Y within a predetermined range (see FIG. 7C).

When the development at the developing position ends, the joint 52 is retracted in a direction G shown in FIG. 5B. As a result, the lugs 53*a* of the coupling 53 are released from the pawls 51*b* existing in the concavity 51*a* of the coupling gear 51Y and then from the concavity 51*a*. Subsequently, the revolver 4 is bodily rotated to perform the next predetermined operation.

When the sequence of steps for development is completed, the drive of the printer body for development is interrupted. Consequently, all the developing units 22Y–22K are rendered inoperative.

Figure 8:
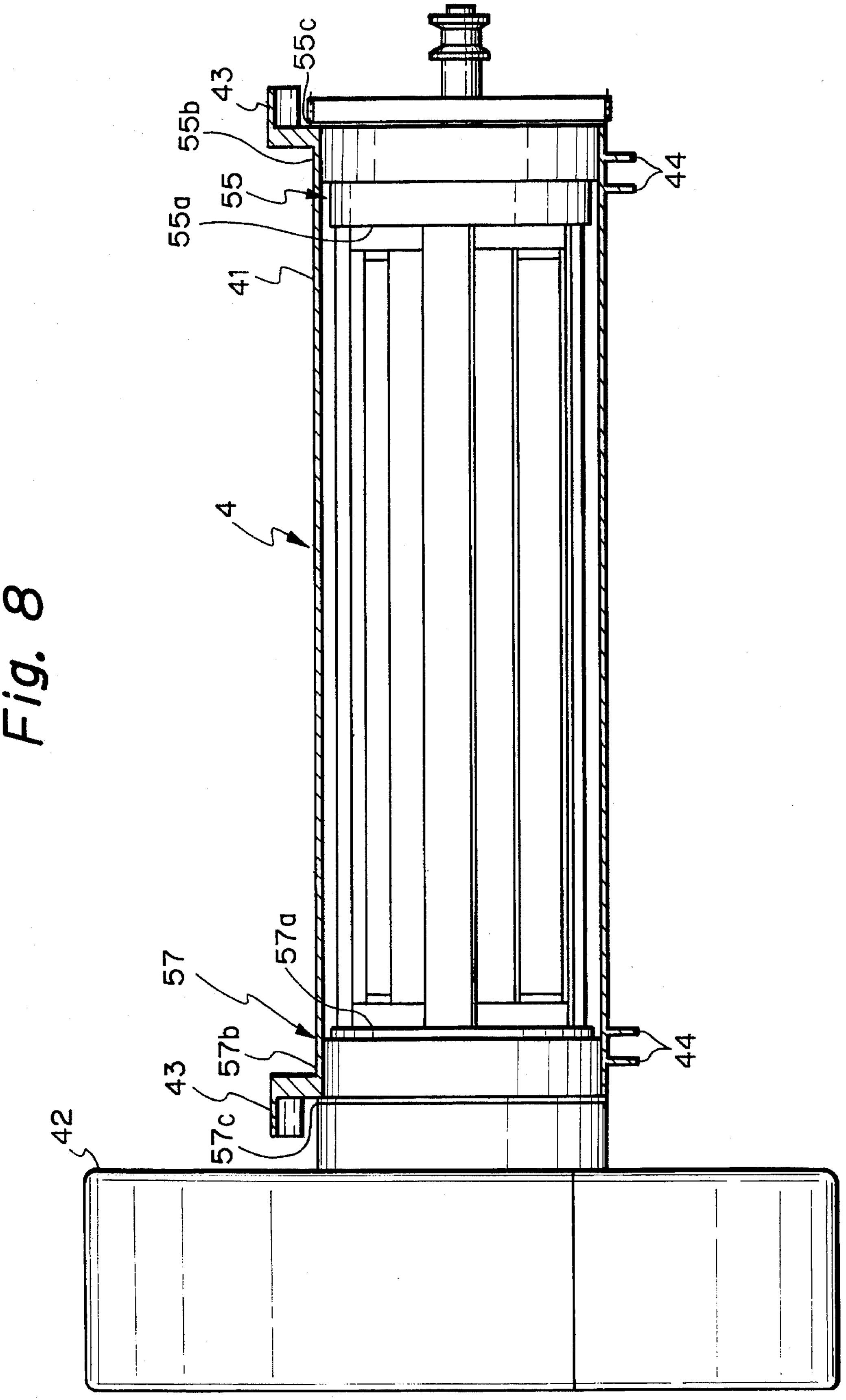
FIG. 8 shows end wall members attached to the cover of the developing device.
Figure 9A:
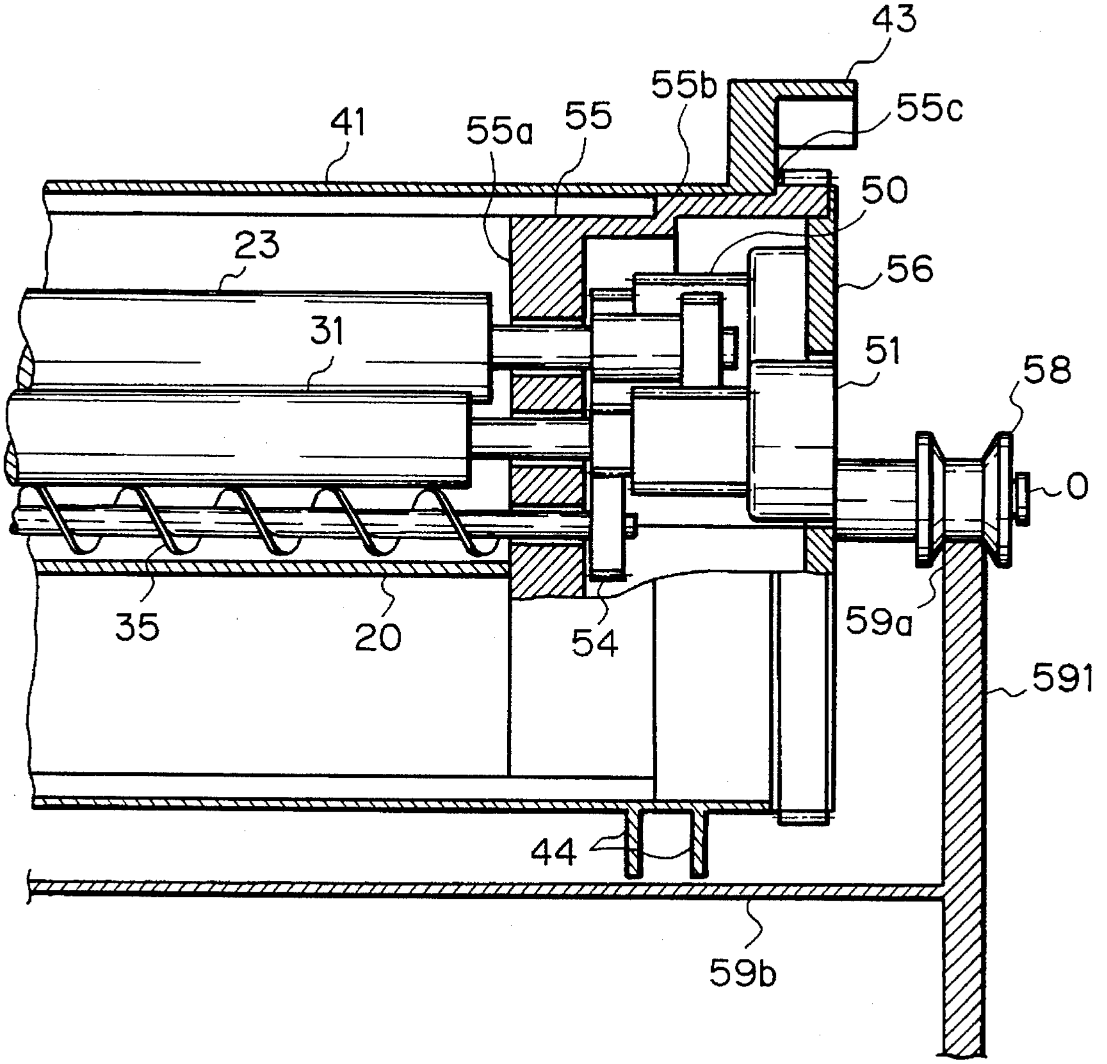
FIG. 9A is a section showing an end wall member included in the embodiment and adjoining a drive section.
Figure 9B:
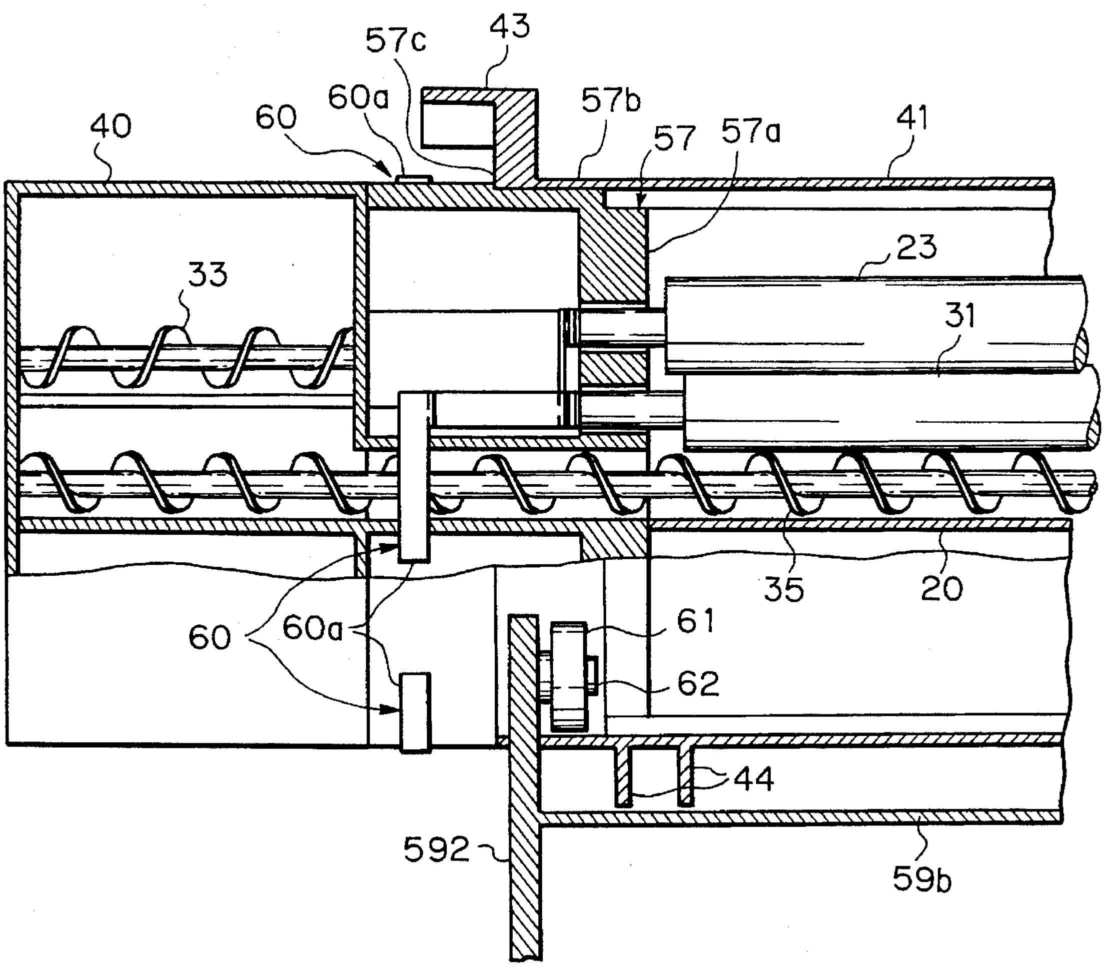
FIG. 9B is a view similar to FIG. 9A, showing an end wall member adjoining a toner chamber.

As shown in FIGS. 8, 9A and 9B, the revolver 4 is covered with a cover member 41 and end wall members 55 and 57. As shown in FIG. 8, the cover member 41 extends in the longitudinal direction of the revolver 4 while the end wall members 55 and 57 are affixed to longitudinally opposite ends of the cover member 41. The end wall member 55 is formed with holes throughout which the shafts of the developing rollers 23Y–23K, toner supply rollers 31Y–31K, 95 first screws 33Y–33K and second screws 35Y–35K of the developing units 22Y–22K extend. The end wall member 55 is made up of a disk portion 55*a* and a stepped hollow cylindrical portion extending out from the edge of the disk portion 55*a*. The disk portion 55*a* abuts against one of longitudinally opposite ends of the casing 20 with the above-mentioned shafts received in the respective holes. The disk portion 55*a* and the shaft O are formed integrally with each other.

Likewise, the other end wall member 57 is formed with holes throughout which the shafts of the developing rollers 23–24K, toner supply rollers 31Y–31K, first screws 33Y–33K and second screws 35Y–35K of the developing units 22Y–22K extend. The end wall member 57 is made up of a disk portion 57*a* and a stepped hollow cylindrical portion extending out from the edge of the disk portion 57*a*.

The stepped hollow cylindrical portions of the end wall members 55 and 57 respectively include slide portions 55*b* and 57*b* each having a diameter smaller than the inside diameter of the cover member 41. The slide portions 55*b* and 57*b* are rotatable in contact with the inner periphery of the cover member 41. Stop portions 55*c* and 57*c* are respectively contiguous with and greater in outside diameter than the slide portions 55*b* and 57*b*. The stop portions 55*c* and 57*c* abut against the opposite ends of the cover member 41. The cover member 41 is provided with a cylindrical configuration such that the outer surfaces of the slide portions 55_b_ and 57_b_ are rotatable in contact with the inner surface of the cover member 41. Specifically, the cover member 41 has an inside diameter greater than the outside diameter of the slide portions 55_b_ and 57_b_, but smaller than the outside diameter of the stop portions 55_c_ and 57_c_. In this condition, the revolver 4 is bodily rotatable within the cover member 41. The stops 55_c_ and 57_c_ position the revolver 4 in the thrust direction.

The end wall member 55 is positioned at the driving end of the revolver 4. An arrangement around the end wall member 55 will be described with reference to FIG. 9A. The coupling gears 51Y–51K of the developing units 22Y–22K, gears 50Y–50K respectively mounted on the shafts of the developing rollers 23Y–23K, and gears 54Y–54K respectively mounted on the shafts of the first screws 33Y–33K (as well as gears respectively mounted on the shafts of the second screws 35Y–35K) are disposed in the hollow of the stepped hollow cylindrical portion of the end wall member 55. A disk-like cover 56 is mounted on the end of the stop portion 55_c_ and formed with holes at positions corresponding to the coupling gears 51Y–51K of the developing units 22Y–22K and the shaft O. In this configuration, the drive section of the revolver 4 is not exposed to the outside of the revolver 4. This prevents impurities, which are apt to damage the drive section, from entering the drive section and insures safety operation. Also, the diameter of the hole of the cover 56 assigned to the shaft O and the outside diameter of the cover 56, as well as positional accuracy, are adequately selected to provide the hollow end wall member 55 with sufficient mechanical strength and to position it accurately relative to the shaft O. A positioning roller 58 is mounted on the shaft O outboard of the cover 56 and rotatable coaxially with and relative to the shaft O. The printer body includes a side panel 591 having a support portion 59_a_ at the top thereof. When the revolver 4 is mounted to the printer body, the roller 58 rests on the support portion 59_a_ in a predetermined manner, thereby positioning the revolver 4 (drive side).

A reference will be made to FIG. 9B for describing an arrangement around the other end wall member 57 which adjoins the toner chamber 40. Let the following description concentrate on the differences of the end wall member 57 from the end wall member 55 in order to avoid redundancy. As shown, the shafts of the developing rollers 23Y–23K and toner supply rollers 31Y–31K have their ends received in the hollow of the stepped hollow cylindrical portion of the end wall member 57. These shafts are each positioned in the thrust direction by, for example, an E-ring within the hollow of the end wall member 57. In each of the developing units 22Y–22K, a flat electrode 60 is held in contact with the ends of the above-mentioned shafts and made of phosphor bronze or similar resilient material. The flat electrode 60 has a contact portion 60_a_ protruding from the cylindrical portion of the end wall member 57 and extending on and along the outer periphery of the cylindrical portion.

Figure 10:
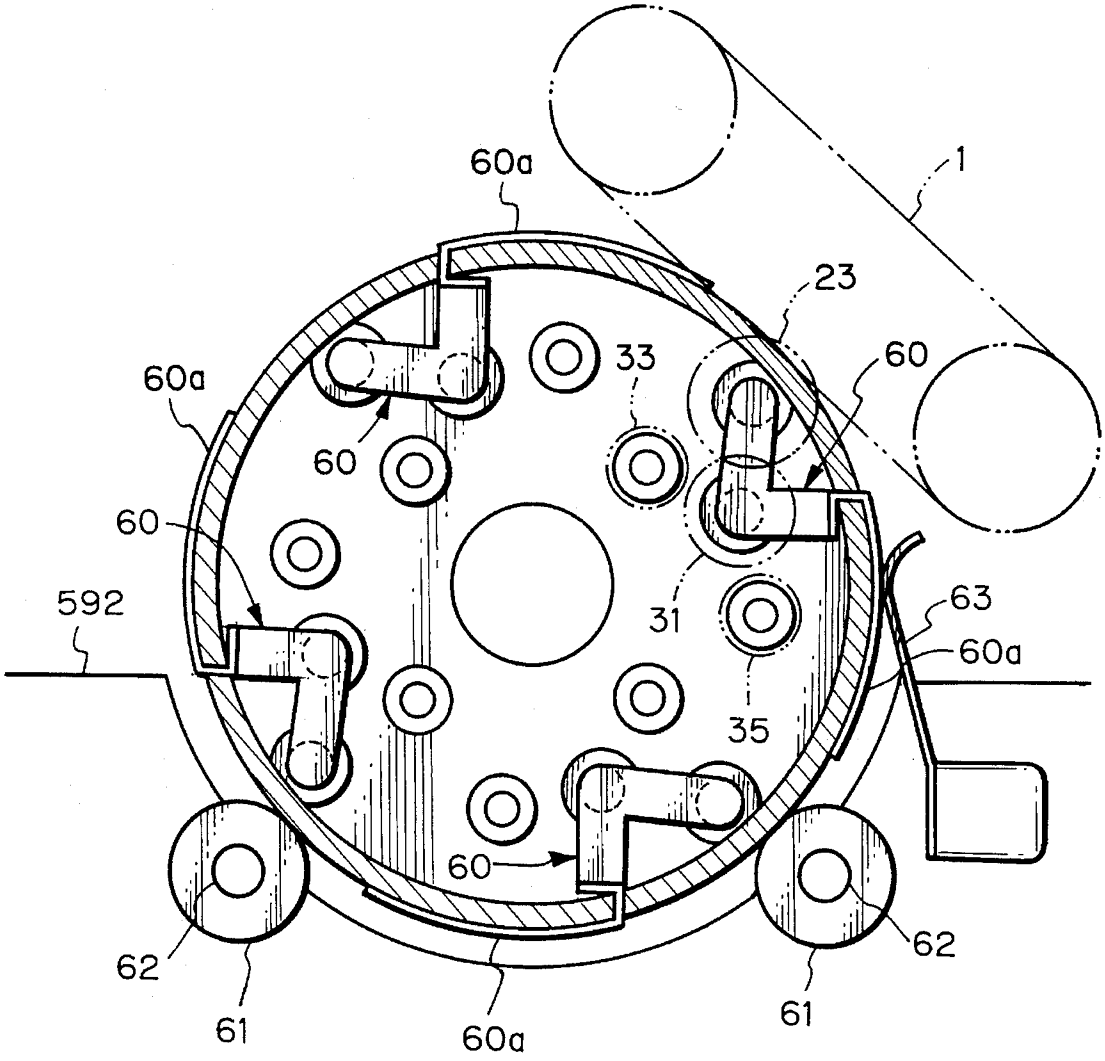
FIG. 10 is a section showing an arrangement around the end wall member adjoining the toner chamber.

As shown in FIG. 10, a resilient bias electrode 63 is affixed to the printer body and connected to a high tension power source, not shown. The bias electrode 63 is positioned such that it contacts the contact portion 60_a_ of the flat electrode 60 when one of the developing units 22Y–22K having the electrode 60 is brought to the developing position. Specifically, when the casing 20 revolves, the contact portion 60_a_ is brought into sliding contact with the bias electrode 63 at and around the developing position. As a result, a predetermined bias is applied to one of the developing unit 22Y–22K arrived at the developing position. In the illustrative embodiment, the same bias is applied to the developing roller 23 and toner supply roller 31. Alternatively, when a different bias should be applied to each of the rollers 23 and 31, a plurality of contact portions 60_a_ and a plurality of bias electrodes 63 may be arranged in parallel.

As shown in FIGS. 9B and 10, the other side panel 592 of the printer body adjoins the toner chamber 40 and is notched in an arcuate shape. A pair of stubs 62 are affixed to the notched portion of the side panel 592 symmetrically in the right-and-left direction. A support roller 61 is rotatably mounted on each of the stubs 62. When the revolver 4 is mounted to the printer body, the disk portion 57_a_ of the end wall member 57 rests on the pair of support rollers 61 and thereby positions the revolver 4 relative to the printer body. The circumference of the slide portion 57_b_ of the end wall member 57 is enclosed by the cover member 41. The cover member 41 is, therefore, formed with holes 64, FIG. 11, at positions which face the support rollers 61 when the revolver 4 is mounted to the printer body.

The end wall member 57 has the circumference of the slide portion 57_b_ enclosed by the cover member 41, as stated above. This protects the slide portion 57_b_, which needs accuracy for positioning, and frees it from scratches, deformation and other troubles during the course of transport or storage. Moreover, since the toner or similar impurity is prevented from entering the gap between the cover member 41 and slide portion 57_b_, the developing units 22Y–22K are accurately positioned at all times.

Legs 44 extend downward from the bottom of and in the vicinity of opposite ends of the cover member 41. The legs each has a flat bottom, so that the revolver 4 can be stably positioned when removed from the printer body. As shown in FIGS. 9A and 9B, a stop 59_b_ extends between the side panels 591 and 592 of the printer body. When the revolver 4 is mounted to the printer body, the legs 44 are slightly spaced apart from the stop 59_b_. Hence, when the revolver 4 revolves, the legs 44 and stop 59_b_ prevent the cover member 41 from rotating; only the developing units 22Y–22K inside the cover member 41 are rotatable relative to the member 41.

Further, knobs 43 extend upward from the top of and in the vicinity of opposite ends of the cover member 41 (see FIGS. 8, 9A, 9B and 11). To mount and dismount the revolver 4 from the printer body, the knobs 43 are held by hand. As the construction described above indicates, when the revolver 4 is left at the outside of the printer or when it is mounted to or dismounted from the printer body with the knobs 43 held by hand, a load attributable to the weight of the revolver 4 acts. As a result, the revolver 4 is prevented from accidentally rotating relative to the cover member 41 by the friction acting between the inner periphery of the cover member 41 and the slide portions 55_b_ and 57_b_ of the end wall members 55 and 57. Conversely, when the revolver 4 is set in the printer body, only the weight of the cover member 41 acts between the cover member 41 and the slide portions 55_b_ and 57_b_, causing a minimum of friction to act therebetween. Hence, the developing units 22Y–22K can rotate relative to the cover 41 easily.

In the illustrative embodiment, the cover member 41 is prevented from rotating by the legs 44 and stop 59_b_. Alternatively, the stop 59_b_ may be positioned above and in close proximity to the cover member 41 such that it restricts the rotation of the member 41 in abutment against the knobs 43.

Figure 11:
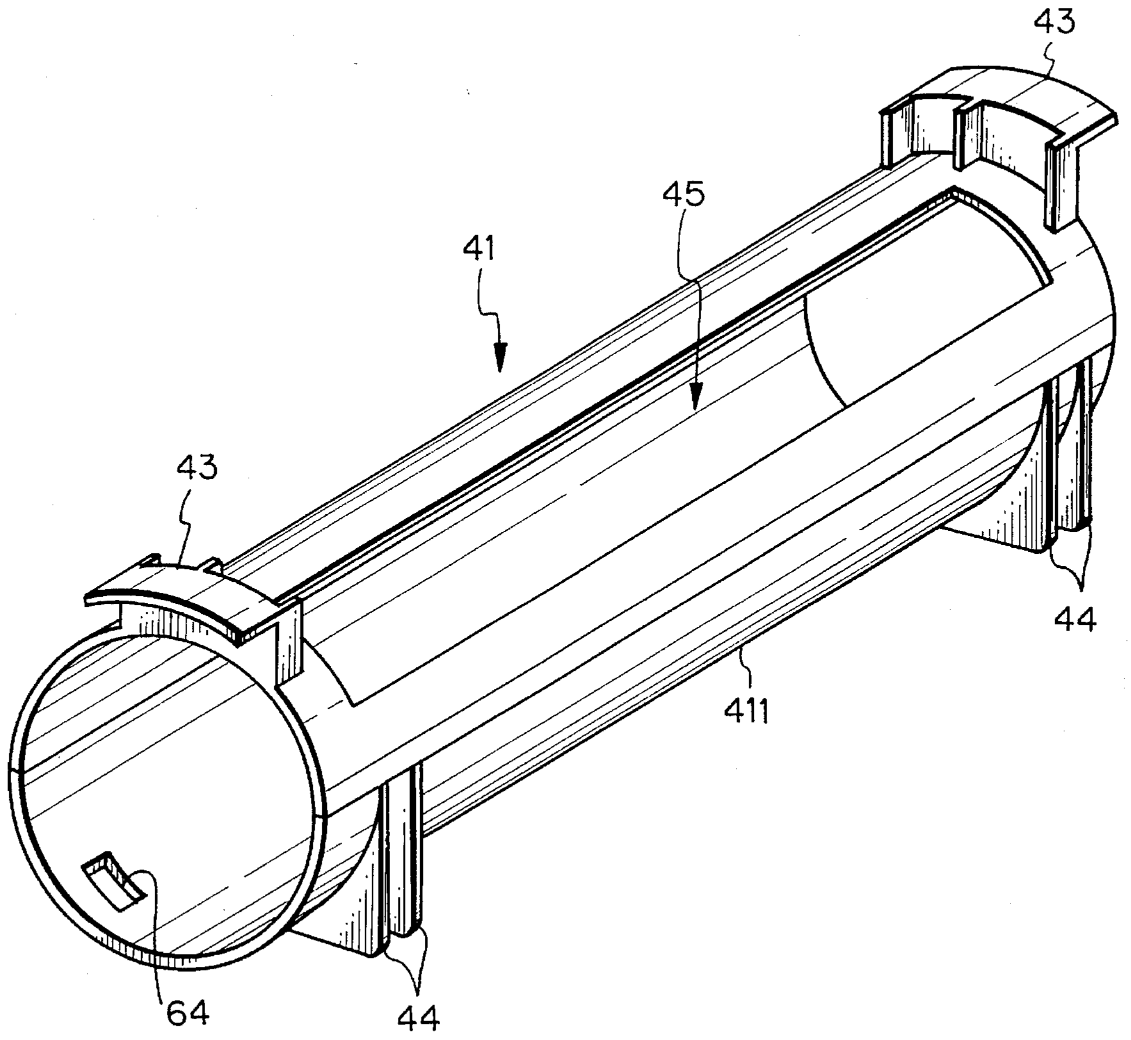
FIG. 11 is a perspective view of a cover member also included in the embodiment.
Figure 12A:
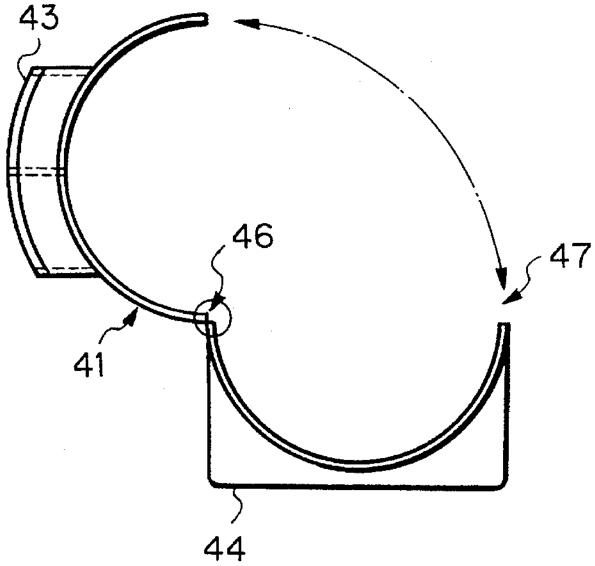
FIGS. 12A and 12B shows how the cover member is opened and closed.
Figure 12B:
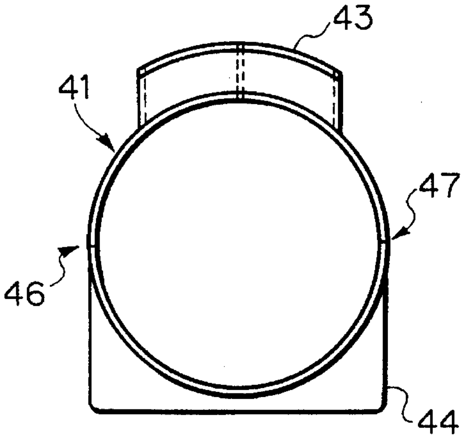
Figure 12C:
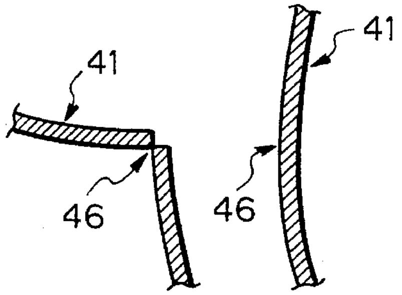
FIG. 12C is a section of a thin hinge portion included in the cover member.
Figure 12D:
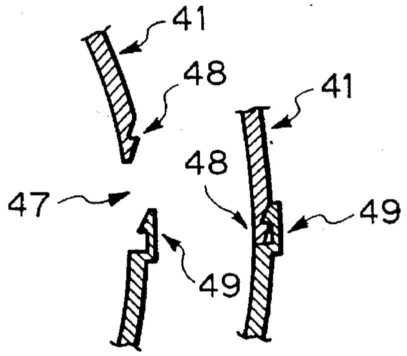
FIG. 12D is a section of locking portions also included in the cover member.

The configuration of the cover member 41 will be described more specifically with reference to FIGS. 11 and 12A–12D. As shown in FIG. 11, the cover member 41 has a hollow cylindrical body 411 with which the knobs 43 and legs 44 are formed integrally, as stated above. An opening 45 is formed through the body 411 such that it faces the photoconductive belt 1 when the revolver 4 is mounted to the printer body. As shown in FIGS. 12A–12D, the cover 41 is provided with a thin hinge portion 46 (see FIG. 12C) and a separable portion 47 (see FIG. 12D) in the circumferential wall thereof. The thin hinge portion 46 extends throughout the length of the cover member 41 while the separable portion 47 assumes a position substantially symmetrical to the hinge portion 46. As shown in FIG. 12A and 12B, the cover member 41 is openable about the thin hinge portion 46. As shown in FIG. 12D, the separable portion 47 is implemented as an upper and a lower locking portion 48 and 49. When the cover member 41 is closed about the hinge portion 46, the locking portions 48 and 49 mate with each other to lock the member 41 in the closed position. In this condition, the cover member 41 enclose the developing units 22Y–22K and part of the end wall members 55 and 57. Of course, such a configuration of the cover member 41 is only illustrative and may be replaced with an upper and a lower member which are separate from and can be coupled to each other.

In summary, it will be seen that the illustrative embodiment has various unprecedented advantages, as enumerated below.

(1) The developing roller gear 50, coupling gear 51, second screw gear 54 and other drive transmission members are received in the bowl-like hollow of the end wall member 55. Such members are, therefore, protected without resorting to a cover, case or similar extra member. In addition, the configuration of the embodiment provides the revolver 4 with attractive appearance.

(2) The cover member 41 extends between the end wall members 55 and 57, but the former does not cover the latter. This prevents the revolver 4 from being increased in size, prevents the toners of different colors from flying about from the revolver 4 to contaminate the inside of the printer or from being mixed together, and prevents impurities from entering the revolver 4.

(3) The cover 56, adjoining the end wall member 55 and covering the drive section, further enhances the protection of the drive transmission members existing in the hollow of the end wall member. Also, the cover 56 further improves the appearance of the revolver 4.

(4) When the revolver 4 is removed from the printer body, the operator is prevented from touching the drive transmission members intentionally or unintentionally. Hence, the protection of the drive transmission members and safety operation are promoted.

(5) Even when the thickness and weight of the end wall member 55 are reduced, the cover 56 prevents the member 55 from being deformed. This allows the revolver 4 to be accurately positioned relative to the printer body.

(6) Since the shaft O, defining the center of rotation of the revolver 4, is received in the hole formed in the cover 56, it is prevented from bending or otherwise deforming. Hence, the end wall member 55 and shaft O are accurately positioned relative to each other, further promoting the accurate positioning of the revolver 4 relative to the printer body.

(7) In each of the developing units 22Y–22K, the portion where the flat electrode 60 is connected to the developing roller and toner supply roller is received in the bowl-like hollow of the end wall member 57. This, coupled with the fact that the hollow of the end wall member 57 is concealed by the toner chamber 40, substantially prevents such a portion from being deformed by an unexpected external force and prevents impurities from depositing on contacts; otherwise, the electrode members and the revolver would be brought out of expected contact.

(8) Since the contact portions **60*a* of the flat electrodes 60 extend on and along the outer periphery of the end wall member 57, they undergo a minimum of deformation and surely remain in contact with the bias electrode 63**.

(9) The inner periphery 41 of the cover member 41 are held in sliding contact with the slide portions **55*b* and 57*b* of the end wall members 55 and 57. Hence, the developing units 22Y–22K and cover member 41** can smoothly slide on each other while having their relative position surely maintained.

(10) The stop portions **55*c* and 57*c* of the end wall members 55 and 57 restrict the movement of the cover member 41 in the longitudinal direction. As a result, the cover member 41 is positioned relative to the developing units 22Y–22K** by a simple implementation.

(11) The end wall members 55 and 57, which need accuracy for positioning, have their slide portions **55*b* and 57*b* protected by the cover member 41. Therefore, these members 55 and 57** are free from damage, deformation and other troubles which are apt to occur during transport or storage.

(12) Since the toners and other impurities are prevented from entering and depositing on the slide portions **55*b* and 57*b*, the developing units 22Y–22K** are accurately positioned at all times.

(13) In the printer body, the cover member 41 is inhibited from rotating by the legs 44 and stop **59*b* or the knobs 43 and stop 59*b* and, therefore, held in a predetermined position at all times. It follows that the developing units 22Y–22K and the cover member 41** are maintained in a predetermined positional relation in the direction of rotation, promoting smooth image formation.

(14) The positioning roller 58 mounted on the shaft O rollably rests on the top or support portion **59*a* of the side panel 591 of the printer body. Also, the support rollers 61 mounted on the printer body directly support the slide portion 57*b* of the end wall member 57 via the holes 64. Hence, the developing units 22Y–22K are positioned and affixed to the printer body without the intermediary of the cover member 41. Consequently, the developing units 22Y–22K** can be surely positioned relative to the printer body.

(15) It is not necessary to provide the cover member 41 with a positioning portion or to make it rigid for enhancing accurate positioning. The cover 41 and, therefore, the entire revolver 4 is small size and inexpensive.

(16) The revolver 4 can be transported or mounted to the printer body with the knobs 43 of the cover member 31 held by hand. This allows the revolver 4 to be mounted and dismounted from the printer body without increasing the size or complicating the construction thereof.

(17) The legs 44, extending from the cover member 41, allow the member 41 to be stably positioned at the outside of the printer body without rendering the revolver 4 bulky or complicated.

(18) The cover member 41 can be mounted in the radial direction relative to the developing units 22Y–22K while being opened at the separable portion 47. Therefore, at the time of assembly of the revolver 4, for example, the cover 41 can be easily mounted in such a manner as to enclose the developing units 22Y–22K.

(19) The cover member 41 is deformable at the thin hinge portion 46 thereof and, therefore, easy to open and close. This promotes easy mounting of the cover member 41.

(20) The cover member 41 is inexpensive and durable since the thin hinge portion 46 implements a single openable cover member.

(21) When the locking portions 48 and 49 of the cover member 41 mate with each other, the member 41 is locked in a closed position. This, coupled with the above feature (19), allows the cover member 41 to be removed from the developing units 22A–22K. Consequently, maintenance and disassembly are facilitated, promoting recycling, among others.

Various modifications will become possible for those skilled in the art after receiving the teachings of the present disclosure without departing from the scope thereof.

What is claimed is:

1. A revolver type developing device for developing a latent image electrostatically formed on an image carrier of an image forming apparatus by moving a plurality of developing units, one at a time, to a developing position facing said image carrier, said device comprising:

a casing rotatable about a shaft;

a cover member;

a plurality of developing units accommodated in said casing and rotatable about said shaft, said plurality of developing units being selectively brought to the developing position for developing the latent image; and a pair of end wall members provided at longitudinally opposite ends of said plurality of developing units, said pair of end walls each comprising a disk portion at least partially disposed inside of said cover member, and a hollow cylindrical portion extending outward in a longitudinal direction from an edge of said disk portion, said hollow cylindrical portion being formed with an opening.

2. A device as claimed in claim 1, wherein said pair of end wall members each include an outer periphery having at least first and second portions respectively having first and second diameters, wherein said first diameter is smaller than said second diameter, and wherein said first portion of each of said pair of end wall members is disposed inside of said cover member, and said second portion of each of said pair of end wall members is disposed outside of said cover member.

3. A device as claimed in claim 1, wherein said pair of end wall members each include a first portion disposed inside of said cover member and a second portion extending outside of said cover member.

4. A device as claimed in claim 3, wherein inner peripheral portions of said cover member are slidably engaged with outer peripheral portions of each of said pair of end wall members.

5. A device as claimed in claim 1, wherein inner peripheral portions of said cover member are slidably engaged with outer peripheral portions of each of said pair of end wall members.

6. A revolver type developing device for developing a latent image electrostatically formed on an image carrier of an image forming apparatus by moving a plurality of developing units, one at a time, to a developing position facing said image carrier, said device comprising:

a casing rotatable about a shaft;

a plurality of developing units accommodated in said casing and rotatable about said shaft, said plurality of developing units being selectively brought to the developing position for developing the latent image: and a pair of end wall members provided at longitudinally opposite ends of said plurality of developing units, said pair of end walls each comprising a disk portion and a hollow cylindrical portion extending outward in a longitudinal direction from an edge of said disk portion, said hollow cylindrical portion being formed with an opening;

wherein said hollow cylindrical portion accommodates parts associated with said plurality of developing units and located outside of said plurality of developing units in the longitudinal direction.

7. A device as claimed in claim 6, wherein said parts comprise drive transmission members for transmitting a drive force to said plurality of developing units.

8. A revolver type developing device for developing a latent image electrostatically formed on an image carrier of an image forming apparatus by moving a plurality of developing units, one at a time, to a developing position facing said image carrier, said device comprising:

a casing rotatable about a shaft;

a plurality of developing units accommodated in said casing and rotatable about said shaft, said plurality of developing units being selectively brought to the developing position for developing the latent image; and a pair of end wall members provided at longitudinally opposite ends of said plurality of developing units, said pair of end walls each comprising a disk portion and a hollow cylindrical portion extending outward in a longitudinal direction from an edge of said disk portion, said hollow cylindrical portion being formed with an opening;

the device further comprising a cover covering said opening of said hollow cylindrical portion.

9. A device as claimed in claim 8, wherein said cover is engaged with said opening, whereby part of said hollow cylindrical portion adjoining said opening has rigidity thereof increased in order to regulate cylindricality of said opening.

10. A device as claimed in claim 8, wherein said pair of end wall members are formed integrally with said shaft.

11. A device as claimed in claim 10, wherein said cover member is formed with a hole for receiving said shaft.

12. A revolver type developing device for developing a latent image electrostatically formed on an image carrier of an image forming apparatus by moving a plurality of developing units, one at a time, to a developing position facing said image carrier, said device comprising:

a casing rotatable about a shaft;

a plurality of developing units accommodated in said casing and rotatable about said shaft, said plurality of developing units being selectively brought to the developing position for developing the latent image; and a pair of end wall members provided at longitudinally opposite ends of said plurality of developing units, said pair of end walls each comprising a disk portion and a hollow cylindrical portion extending outward in a longitudinal direction from an edge of said disk portion, said hollow cylindrical portion being formed with an opening;

the device further comprising a plurality of electrode members each being associated with one of said plurality of developing units for applying a predetermined bias voltage, said plurality of electrode members each being connected to the respective developing unit within said hollow cylindrical portion and connected to a voltage supply section, which is provided on said image forming apparatus, on and along an outer periphery of said hollow cylindrical portion.

13. A revolver type developing device for developing a latent image electrostatically formed on an image carrier of an image forming apparatus by moving a plurality of developing units, one at a time, to a developing position facing said image carrier, said device comprising:

a casing rotatable about a shaft;

a plurality of developing units accommodated in said casing and rotatable about said shaft, said plurality of developing units being selectively brought to the developing position for developing the latent image and comprising respective developer carriers;

a pair of end wall members provided at longitudinally opposite ends of said plurality of developing units, and each comprising at least a disk portion; and a hollow cylindrical cover member extending between said pair of end wall members and spaced apart from said developer carriers by a predetermined gap;

wherein said pair of end wall members each include an outer periphery having at least first and second portions respectively having first and second diameters, wherein said first diameter is smaller than second diameter, and wherein said first portion of each of said pair of end wall members is disposed inside of said cover member, and said second portion of each of said pair of end wall members is disposed outside of said cover member.

14. A device as claimed in claim 13, wherein said cover member is formed with an opening at a position facing the image carrier.

15. A device as claimed in claim 13, further comprising knobs formed integrally with said cover member.

16. A device as claimed in claim 13, further comprising legs formed integrally with said cover member for maintaining said cover member in a stable position.

17. A device as claimed in claim 13, wherein said cover member comprises a separable portion at least in part of a circumference thereof, said separable portion extending over an entire length of said cover member for allowing said cover member to be opened.

18. A revolver type developing device for developing a latent image electrostatically formed on an image carrier of an image forming apparatus by moving a plurality of developing units, one at a time, to a developing position facing said image carrier, said device comprising:

a casing rotatable about a shaft;

a plurality of developing units accommodated in said casing and rotatable about said shaft, said plurality of developing units being selectively brought to the developing position for developing the latent image and comprising respective developer carriers;

a pair of end wall members provided at longitudinally opposite ends of said plurality of developing units, and each comprising at least a disk portion; and a hollow cylindrical cover member extending between said pair of end wall members and spaced apart from said developer carriers by a predetermined gap;

wherein an inner periphery of said cover member is slidably engaged with outer peripheries of said pair of end wall members.

19. A device as claimed in claim 18, further comprising restricting means for restricting rotation of said cover member such that when said device is mounted to the image forming apparatus, only said device disposed in said cover member is freely rotatable.

20. A device as claimed in claim 19, wherein said restricting means comprises knobs formed integrally with said cover member.

21. A device as claimed in claim 19, wherein said restricting means comprises legs formed integrally with said cover member and a stationary abutment engageable with said legs, whereby said cover member is maintained in a stable position at the outside of the image forming apparatus.

22. A device as claimed in claim 18, further comprising positioning means supported by a support portion of the image forming apparatus for positioning said device relative to said image forming apparatus.

23. A device as claimed in claim 18, wherein said cover member is formed with an opening at a longitudinal end facing said support portion.

24. A revolver type developing device for developing a latent image electrostatically formed on an image carrier of an image forming apparatus by moving a plurality of developing units, one at a time, to a developing position facing said image carrier, said device comprising:

a casing rotatable about a shaft;

a plurality of developing units accommodated in said casing and rotatable about said shaft, said plurality of developing units being selectively brought to the developing position for developing the latent image and comprising respective developer carriers;

a pair of end wall members provided at longitudinally opposite ends of said plurality of developing units, and each comprising at least a disk portion; and a hollow cylindrical cover member extending between said pair of end wall members and spaced apart from said developer carriers by a predetermined gap;

wherein said cover member comprises a separable portion at least in part of a circumference thereof, said separable portion extending over an entire length of said cover member for allowing said cover member to be opened;

wherein said cover member further comprises a thin hinge portion extending over the entire length of said cover member and formed at a position substantially symmetrical to said separable portion, opposite end portions of said cover member, which constitute said separable portion, comprising locking portions engageable with each other for locking said cover member in a closed position.

25. A revolver type developing device for developing a latent image electrostatically formed on an image carrier of an image forming apparatus by moving an image a plurality of developing units, one at a time, to a developing position facing said image carrier, said device comprising:

a casing rotatable about a shaft;

a plurality of developing units accommodated in said casing and rotatable about said shaft, said plurality of developing units being selectively brought to the developing position for developing the latent image and comprising respective developer carriers;

a pair of end wall members provided at longitudinally opposite ends of said plurality of developing units and each comprising a smaller diameter portion, a greater diameter portion extending outward from said smaller diameter portion in a longitudinal direction, and a disk portion located at one of said longitudinally opposite ends; and a cover member extending between said pair of end wall members and spaced apart from said developer carriers by a predetermined gap, said cover member being formed with an opening at a position which faces the image carrier and having an inside diameter smaller than a diameter of said greater diameter portion, said pair of end wall members holding said cover member between the greater diameter portions thereof.

* * * * *